Dec. 5, 1939.   J. F. HIGBEE   2,182,560
DUAL WHEEL ASSEMBLY
Original Filed Oct. 23, 1936
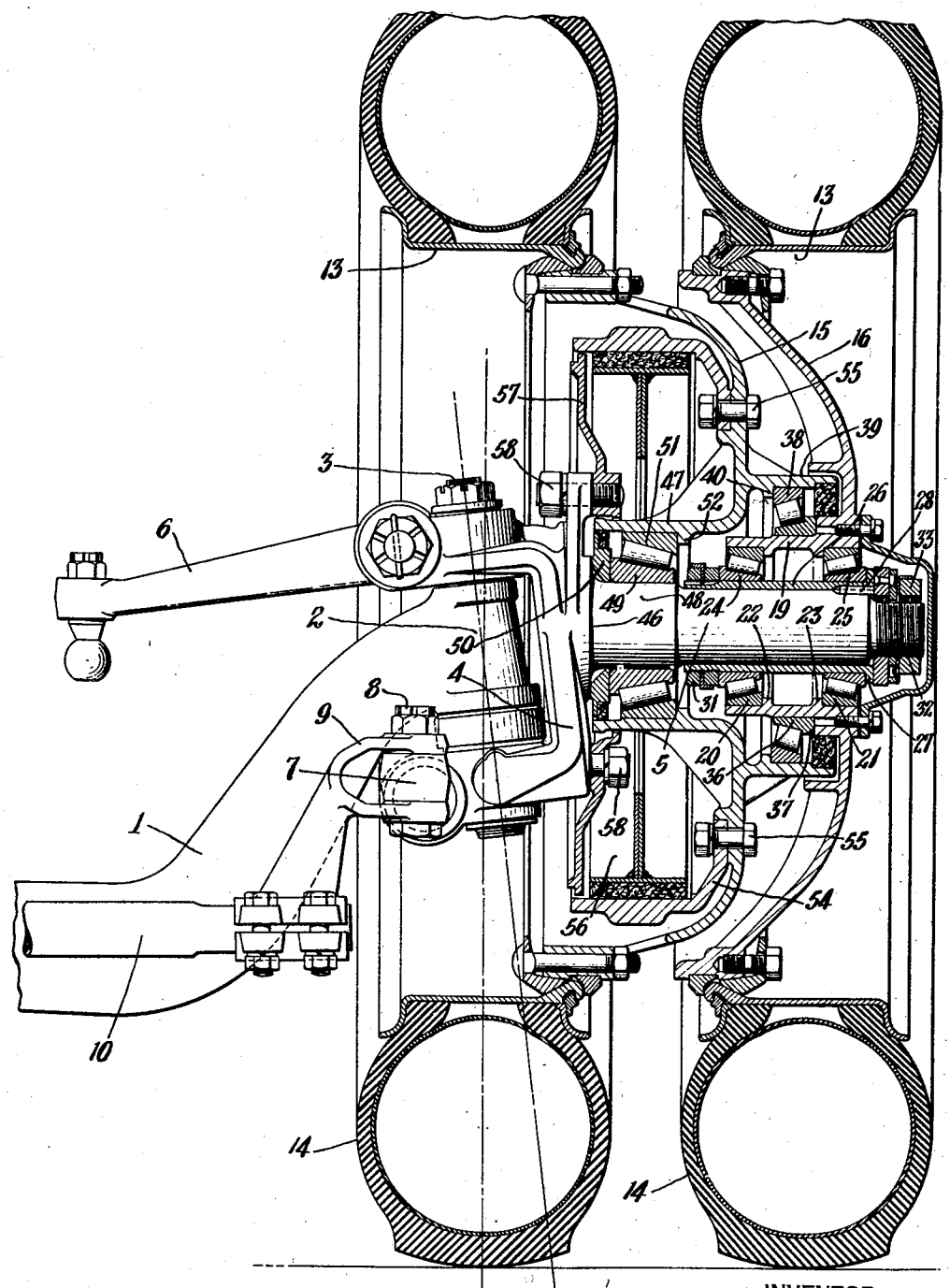
INVENTOR
J. F. Higbee
BY
Morgan Finnegan & Durham
ATTORNEY

UNITED STATES PATENT OFFICE 2,182,560

DUAL WHEEL ASSEMBLY

James F. Higbee, Detroit, Mich.

Application October 23, 1936, Serial No. 107,123
Renewed May 13, 1939, Serial No. 107,123

7 Claims. (Cl. 280—96.1)

The invention relates to new and useful improvements in the steering mechanism of automotive vehicles and more particularly to such improvements in dirigible dual wheel assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

The drawing is a vertical transverse section through a dual wheel assembly and the steering connections therefor constructed in accordance with the invention.

Objects of the invention are to provide a simple, sturdy and reliable dual wheel assembly which in certain of its features is especially adapted for the dirigible front wheels of heavy-duty traction vehicles; to provide in such dual wheel mechanisms a construction which is both compact and sturdy and permits the treads of the dual wheels to be relatively close together; to provide a dual wheel mechanism of the kind described wherein a brake drum mechanism is mounted within the wheel structure, that is, without increasing the over-all size of the assembly structure and still permitting the wheel treads to be relatively close together; to provide such a wheel assembly structure with braking means especially adapted to the dirigible front wheels of heavy vehicles. These objects of invention, together with others, will be more fully set out hereinafter in connection with the following detail description of the present preferred embodiment of the invention. The present invention in certain of its aspects is in the nature of an improvement on my Patent No. 1,970,378.

Referring now in detail to the embodiment of the invention illustrated by way of example in the accompanying drawing, the invention is shown applied to the dirigible front wheels of a mobile vehicle, a mechanism wherein the invention finds one of its chief applications. As embodied, an axle 1 has at its outer ends head 2, each constituting a member of a steering knuckle. Pivotally mounted on the head 2 by means of the pivot pin or king bolt 3 is the other member of the steering knuckle, comprising a yoke 4, to which is fixed an outwardly-extending spindle 5 upon which the dual wheels are journaled. Fixed to the upper end of the yoke 4 is a steering arm 6, which is connected to the driver's steering wheel in the usual manner. Projecting from the lower part of the yoke 4 is an arm 7 to which is pivotally connected, by means of a bolt 8, the yoked end 9 of the tie rod 10 which extends across and connects to the similar wheel assembly at the other end of the axle 1.

Journaled on the spindle 5, side by side, are two independently rotatable wheels 15 and 16, both of the wheels being inwardly dished, one within the other, the inner wheel 15 being dished to a greater degree than the outer wheel 16. The wheels are provided with suitable rim structures 13 and tires 14. The hubs of the two wheels are nested or telescoped on the spindle 5, as will be later described in detail, and by reason of this structure the wheels are brought inwardly so that the outer wheel does not project beyond the spindle, the treads of the wheels are maintained relatively closely together, and the axis of the steering knuckle is within or substantially within the vertical plane of the inner wheel. The outer wheel 16, of the inwardly dished form already described, has an inwardly-projecting hub 19, within which are the outer raceways 20 and 21 of two conical roller bearings, these raceways abutting against inwardly-projecting annular flanges 22 and 23 formed within the hub 19.

The inner raceways 24 and 25 of these roller bearings are carried upon a sleeve 26, mounted upon the diminished outer part of the spindle 5. The sleeve 26 has at its outer end an outwardly projecting annular flange 27, against which the outer side of the roller bearing raceway 25 abuts. The sleeve 26 is fixed against rotation on the spindle 5 by a key 28. The inner end of the sleeve 26 is screw-threaded, and retaining nuts 31 are screw-threaded thereon, so that the inner face of the raceway 24 abuts on the nuts 31. The outer end of the spindle 5 has a screw-thread 32 on which is threaded nuts 33, the inner face thereof abutting from the flange 27 of the sleeve. The two roller bearings are thus held firmly in position longitudinally upon the reduced portion of the spindle 5.

The hub of the inner wheel 15 projects inwardly and outwardly from the face of the wheel, and the outwardly projecting part of the hub partly encloses or telescopes with the hub of the outer wheel just described. As embodied, a roller-bearing raceway 36 is supported upon the exterior of the hub 19 of wheel 16 and abuts against an annular shoulder 37 formed on the inner face of wheel 16. The outer raceway 38 of this bearing is within the hub 39 of the inner wheel 15 and abuts against an annular, inwardly-projecting flange 40 within the hub 39. The bearing is thus held lengthwise between the two hubs. The inwardly projecting part 47 of the hub of the inner wheel 15, which extends inwardly from the face of the wheel, is of lesser diameter, and is journaled directly upon an enlarged part 48 of the spindle 5. In this bearing a roller raceway 49 abuts on an annular thrust plate 50, which is mounted on the spindle and abuts upon the shoulder 46 at the juncture of the steering knuckle 4 and spindle 5. The outer raceway 51 of this bearing abuts against an inwardly-projecting annular flange 52 formed on the interior of the hub 47. Thereby the inner wheel is held firmly against longitudinal displacement, and the entire bearing assembly is held firmly in longitudinal position between the shoulder 46 and the nut 33.

The sleeve 26 is adjustably slidable longitudinally of the spindle 5 and the complete wheel assembly can thereby be adjustably positioned on spindle 5 simply by turning nut 33. Further, this structure will serve to hold the bearing assembly of the outer wheel in perfect adjustment even though the inner wheel bearings should fail.

Braking means are preferably employed applied to the inner wheel, and for this purpose a brake drum 54 is located within the inner dished wheel 15, and is bolted by a series of bolts 55 to the inner face of the wheel. Within the brake drum 54 is a shoe 56, which may be of any known or suitable construction for a swivel-mounted dirigible wheel assembly. A flat annular closure disc 57 closes the open end of the drum 54, and is mounted upon the steering knuckle 4 by a series of bolts 58.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly for a motor vehicle, in combination an axle, a spindle connected to said axle, a non-rotatable sleeve encircling said spindles and slidable therealong, two independently rotatable wheels, bearings for said wheels mounted side by side the bearings for one wheel being mounted on the sleeve while those for the other wheel are mounted on the spindle and on a part of the first wheel, means for maintaining the bearings for said one wheel in fixed longitudinal position on said sleeve, and means for longitudinally moving the sleeve on the spindle to regulate the position of the bearings for both wheels.

2. In a dual wheel assembly for a motor vehicle, in combination an axle, a spindle connected to said axle, a non-rotatable sleeve encircling said spindle and slidable therealong, two independently rotatable wheels, bearings for said wheels mounted side by side the bearings for one wheel being mounted on the sleeve while those for the other wheel are mounted on the spindle and on a part of the first wheel, means for maintaining the bearings for said one wheel in fixed longitudinal position on said sleeve, and screw-threaded means on the end of said spindle for positioning the bearings for both said wheels.

3. In a dual wheel assembly for a motor vehicle, in combination an axle, a spindle connected to said axle, a sleeve encircling said spindle and slidable therealong, two side by side wheels, one of said wheels having at least one bearing mounted on said sleeve, the other of said wheels having at least one bearing mounted on said spindle, and means for moving the sleeve on the spindle to regulate the position of the bearings for both said wheels.

4. In a dual wheel assembly for a motor vehicle, in combination an axle, a spindle connected to said axle, a sleeve encircling said spindle and slidable therealong, two side by side wheels, one of said wheels having at least one bearing mounted on said sleeve, the other of said wheels having at least one bearing mounted on said spindle, and means for moving the sleeve on the spindle to regulate the position of the bearings for said first mentioned wheel.

5. In a dual wheel assembly for a motor vehicle, in combination an axle, a spindle connected to said axle, a sleeve encircling said spindle and slidable therealong, two side by side wheels, one of said wheels having at least one bearing mounted on said sleeve, the other of said wheels having at least one bearing mounted on said spindle, and screw-threaded means on said spindle for regulating the position of the bearings for both said wheels.

6. In a dual wheel assembly for a motor vehicle, in combination an axle, a spindle connected to said axle, a sleeve encircling said spindle and slidable therealong, two side by side wheels, one of said wheels having bearings on said sleeve, the other of said wheels having bearings on said spindle and said first-mentioned wheel, and means for moving said sleeve along said spindle to regulate the position of the bearings for said wheels.

7. In a dual wheel assembly for a motor vehicle, in combination an axle, a spindle connected to said axle, a sleeve encircling said spindle and slidable therealong, two side by side wheels, one of said wheels having bearings on said sleeve, the other of said wheels having bearings on said spindle and said first-mentioned wheel, and screw-threaded means on the end of said spindle for positioning the bearings for both said wheels.

JAMES F. HIGBEE.